CODE APPARATUS FOR RECORDING MANUFACTURING PROCESSES

Filed Sept. 3, 1963 4 Sheets-Sheet 1

INVENTORS
LAJOS DEGE
JÓZSEF SEREGI
By Irwin & Thompson
ATTY.

INVENTORS
LAJOS DEGE
JÓZSEF SEREGI
By Irwin S. Thompson
ATTY.

CODE APPARATUS FOR RECORDING MANUFACTURING PROCESSES

INVENTORS
LAJOS DEGE
JÓZSEF SEREGI

By Irwin S. Thompson
ATTY.

CODE APPARATUS FOR RECORDING MANUFACTURING PROCESSES

Filed Sept. 3, 1963 4 Sheets-Sheet 4

INVENTORS
LAJOS DEGE
JÓZSEF SEREGI
By Irvin S. Thompson
ATTY.

United States Patent Office 3,286,272

Patented Nov. 15, 1966

3,286,272

CODE APPARATUS FOR RECORDING MANUFACTURING PROCESSES

Lajos Dege and József Seregi, Budapest, Hungary, assignors to Villamos Automatika Intezet, Budapest, Hungary Filed Sept. 3, 1963, Ser. No. 306,259
Claims priority, application Hungary, Sept. 15, 1962, DI-80
1 Claim. (Cl. 346—33)

This invention refers to electric apparatus for recording of procedures, particularly for analysing manufacturing processes.

An authentic recording of the course of processes in view of the possibility of a subsequent checking thereof and an evaluation of the results obtained or the like becomes ever more important in scientific and technical activity. A recording which permits subsequent checking and evaluation is of great importance particularly in the domain of manufacturing processes since such recording is solely suitable to permit up-to-date work organisation, just wage system as well as warranting of undisturbed production work of maximum efficiency possibly by means of immediate intervention.

By hitherto known apparatus constructed for such purposes data characteristic of the process in question are ascertained and associated with codes which, in turn, are recorded on a continuously progressing signal carrying medium such as tapes or chart papers. Recording itself is carried through by some recording apparatus, e.g., by pen arm type recorders, while coding is selected by dialling or by means of push buttons, e.g., in the form of numbers. It has also been suggested to distinguish the various processes by the density variations of an array of lines. However, automatic evaluation of such records requires intricate and, therefore, expensive apparatus.

The main object of the present invention is to provide an electric apparatus by which it is possible to record several simultaneous or mutually exclusive processes in an automatically evaluable manner and that without requiring recording apparatus in a number equal to the number of processes to be distinguished. At the same time, automatic evaluation should be rendered possible by relatively simple means. The basic idea of the invention consists in that—instead of by signals or arrays of lines—the processes are distinguished by means of combinations of homogeneous strips since in such case the signals recorded by the recorders may have significance not only in themselves but in their combinations as well. Moreover it means that a given number of recorders is suitable for communicating or recording messages or processes the number of which is greater than the number of the recorders. According to the main feature of the invention this is obtained by the provision of a selector circuit arrangement having an input terminal and at least a pair of output terminals and suitable to connect an input voltage at least to one of said output terminals, each of the output terminals having an electromagnetic recorder connected to it suitable to record signals in the form of strips.

A further object of the present invention is to obtain combinations by both physical or chemical influences, by intervention of operators, or by their combinations.

Another object of the present invention is to transmit interventions of operators by means of push buttons.

Further objects and details of the invention will be described by taking reference to the accompanying drawings which show, by way of example, several embodiments of the present invention and in which.

Same reference characters designate like details throughout the drawings.

Figure 1:
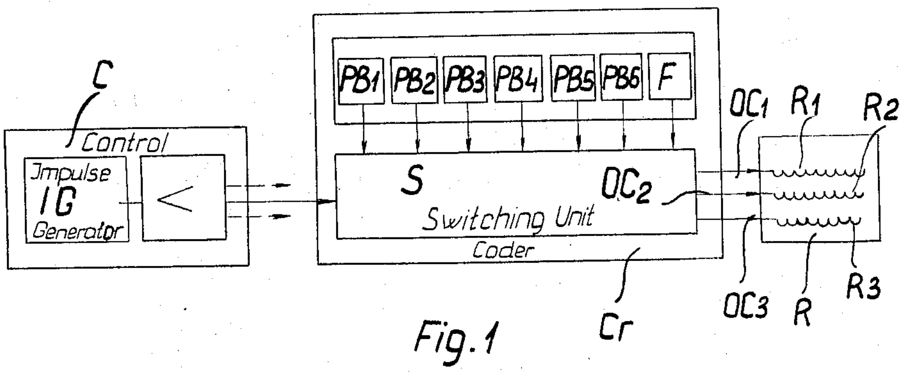
FIG. 1 is a block diagram of a first exemplified embodiment.

In the drawings three main units of the apparatus according to the invention are designated by C, *Cr* and R (FIG. 1), respectively. Of these, C is the feed unit of the apparatus which, in the instant case, consists of a pulse generator unit IG and of an amplifier. Another principal part of the apparatus is the coder unit *Cr* which serves for transmitting the pulses supplied by the unit C to preselected recorders. For this purpose, the coder unit *Cr* comprises, on the one hand, push buttons PB1, PB2, PB3, PB4, PB5, PB6 and a feeler F designated by the common term of information element and, on the other hand, a system of contacts which serve for preselecting the recorders, that is for forming the aforesaid combinations. The connection of the switching unit is such that not more than one push button can be pressed down at a time. However, a push button pressed down stays in such condition until upon operation of another push button it resumes its original inoperative position. The feeler F is either of the push button type or an automatic device. In the former case, information is given by pushing down the push button while with automatic feelers information is formed automatically, e.g. by means of a contact watt meter. As suggested in the drawing, the common feed unit C is associated with a number of coder units *Cr*, each coder unit *Cr* being provided with as many output terminals or connections OC1, OC2, OC3 as there are recorders R1, R2, R3 associated therewith.

Figure 2:
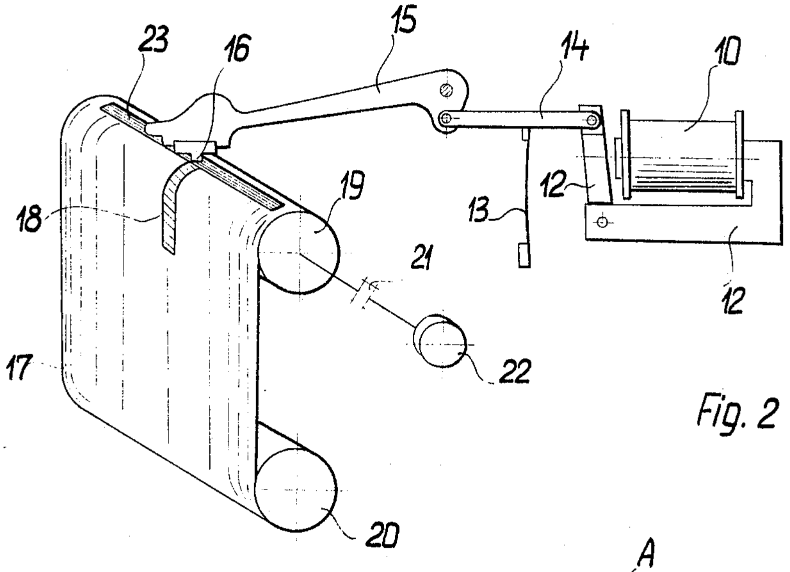
FIG. 2 shows the perspective view of a detail of the same embodiment.

In the instant case, the recorder is built up of keys usual with typewriting machines. An exemplified embodiment of such keys is represented in FIG. 2. A magnet 11 is excited by a coil 10. Field lines are closing through an armature 12. The armature 12 is, by means of a connecting rod 14, biased by a spring 13, and connected to the shorter arm of a key 15 formed as a double armed lever. The extremity of the longer arm of key 15 has a writing organ 16 arranged on it which, in a manner known per se, strikes against a progressed chart paper and makes signals on it which form a continuous strip as shown in the drawing at 18. The chart paper 17 is lead on drums 19 and 20 of which drum 19 is, by means of a clutch 21, connected with a driving motor 22. Reference character 23 designates an ink pad, for instance a type writer ribbon.

Figure 3:
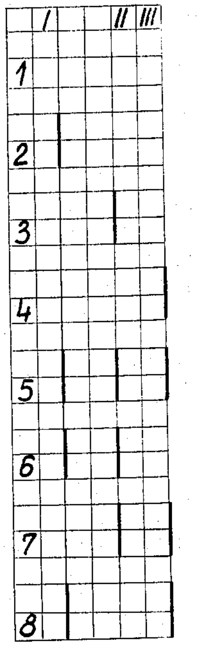
FIGS. 3 and 4 represent examples of recordings of various information.

Obviously, strip combinations according to FIG. 3 may be formed by three devices shown in FIG. 2, which means that processes can be distinguished the number of which is considerably higher than the number of the recorders employed. In such case, with three columns designated by I, II, III and their eight lines by 1, 2, 3, 4, 5, 6, 7, 8 substantially eight possibilities are at disposal to signal simultaneous or mutually excluded processes. With a machine lathe, for example, by the simultaneous absence of code signals in columns I, II and III, inoperation (standstill), more particularly interruption of production, by a strip appearing in line 2 of column I production, by a strip appearing in line 3 of column II machinery setting or changeover to another product, by a strip in line 4 of column III raw material and/or piece part shortage, by strips simultaneously appearing in columns I, II, III in line 5 failure, by simultaneously appearing strips at line 6 of columns I and II tool shortage, by the strips appearing simultaneously at line 7 of columns II and III lack of drawings, finally by strips appearing simultaneously in line 8 of columns I and III personal affairs may be signalled.

Figure 4:
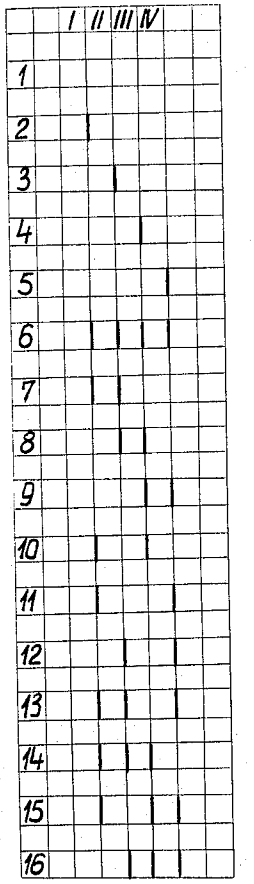

In order to distinguishably record twice as many processes as before only one further recorder has to be employed and associated with the originally provided ones as can be seen in FIG. 4, where strips may appear in four columns I, II, III, IV in fifteen combinations The complete absence of signals being a sixteenth form of information, each of them appearing in one of the lines 1 to 16. Thus, the number of distinguishable information obtainable with the apparatus according to the invention can be increased practically above any limit at normal expenses and in contradistinction to the hitherto known apparatus of similar destination since it exponentially increases with the number of recorders whereby relatively few recorders suffice for recording a relatively great number of processes. If, for instance, a given machine tool is associated with ten recorders, the apparatus according to the invention enabels to distinguish about thousand different processes.

Figure 5:
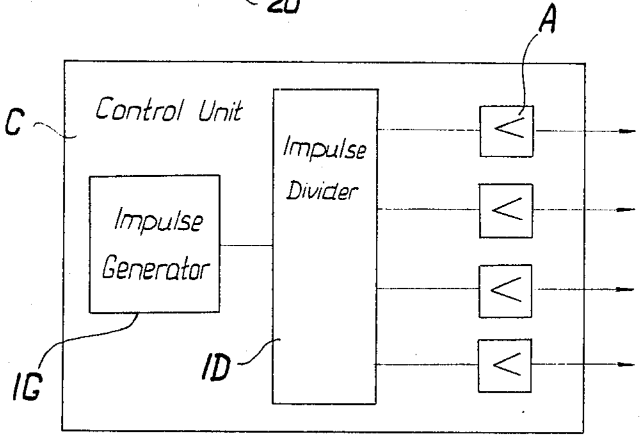
FIG. 5 shows the block diagram of a control unit.
Figure 6:
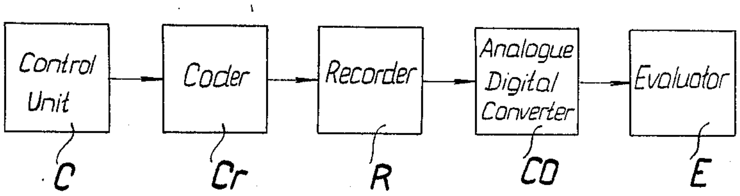
FIG. 6 is the block diagram of another exemplified embodiment.

Instead of first amplifying and then distributing the pulses of the pulse generator IG of the control unit C among the various coder units Cr which requires amplifiers of high output, the impulses of the pulse generator IG could and, preferably, will be lead into an impulse divider ID and amplified individually whereafter they are transmitted to the recorder unit R as is illustrated in FIG. 5.

Figures 7, 8:
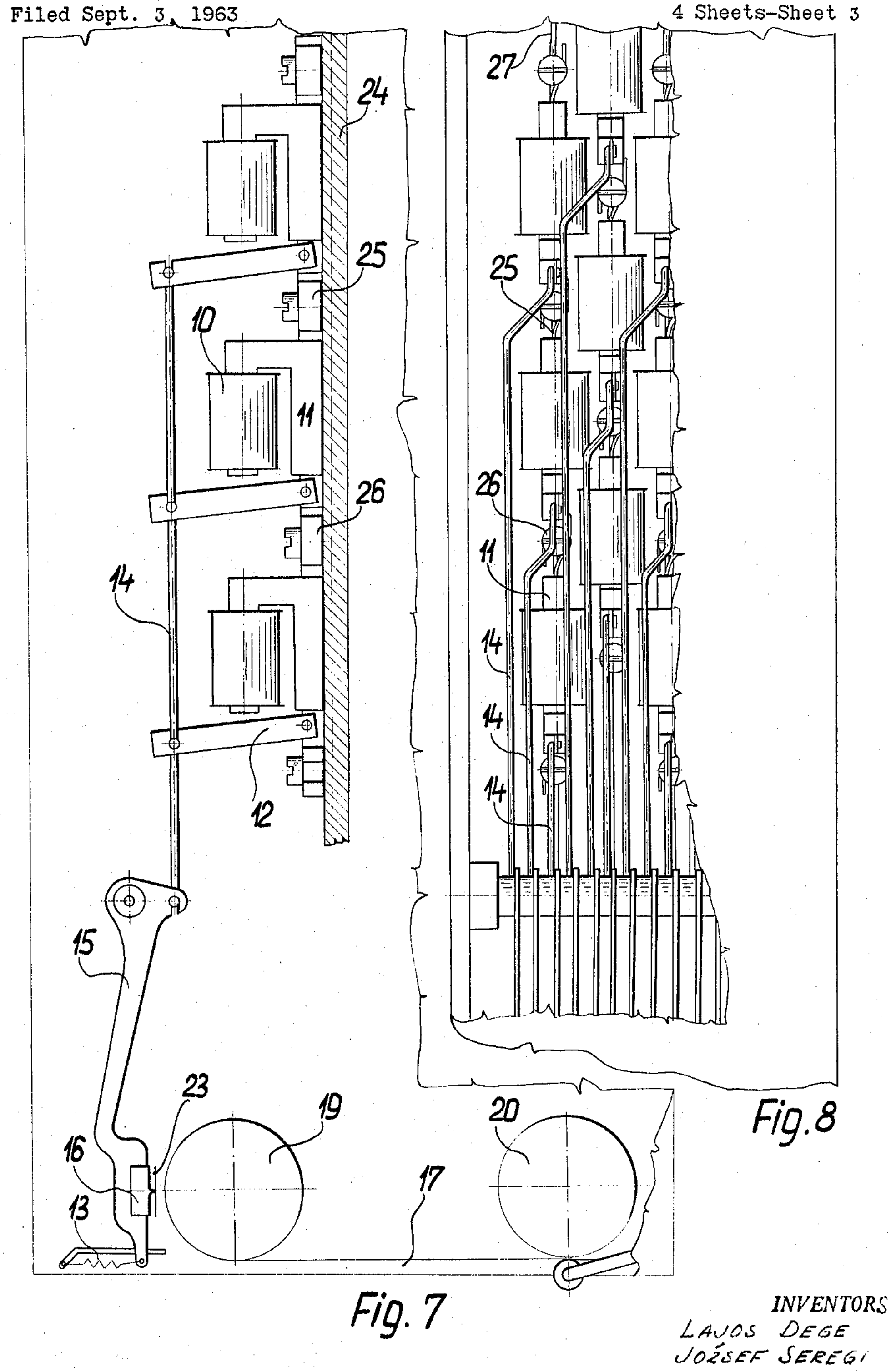
FIG. 7 is a longitudinal sectional view of a recorder as employed with the invention.
FIG. 8 is a top view to FIG. 7, and finally.

The exemplified recorder shown in FIGS. 7 and 8 comprises thirty keys the actuating magnets 11 of which are arranged according to pattern of a checker board on a base board 24. Equidistanced grooves 27 in the base board 24 permit the electromagnets 11 to be fixed therein by means of fixing plates 25 sandwiched between laminations of the iron cores of the magnets. The fixing plates 25 of the magnets are fixed pairwise to the base board 24 by means of screws 26. In the instant case, the recorder keys are connected to the armatures 12 of the magnet by link rods 14 made of steel wire. Their extremity connected to the armatures 12 comprises a bend (FIG. 8) for better space exploitation. Springs 13 which bias the keys 15 so as to occupy their inoperational position are, in the instant case, spiral springs made likewise of steel wire.

Figure 9:
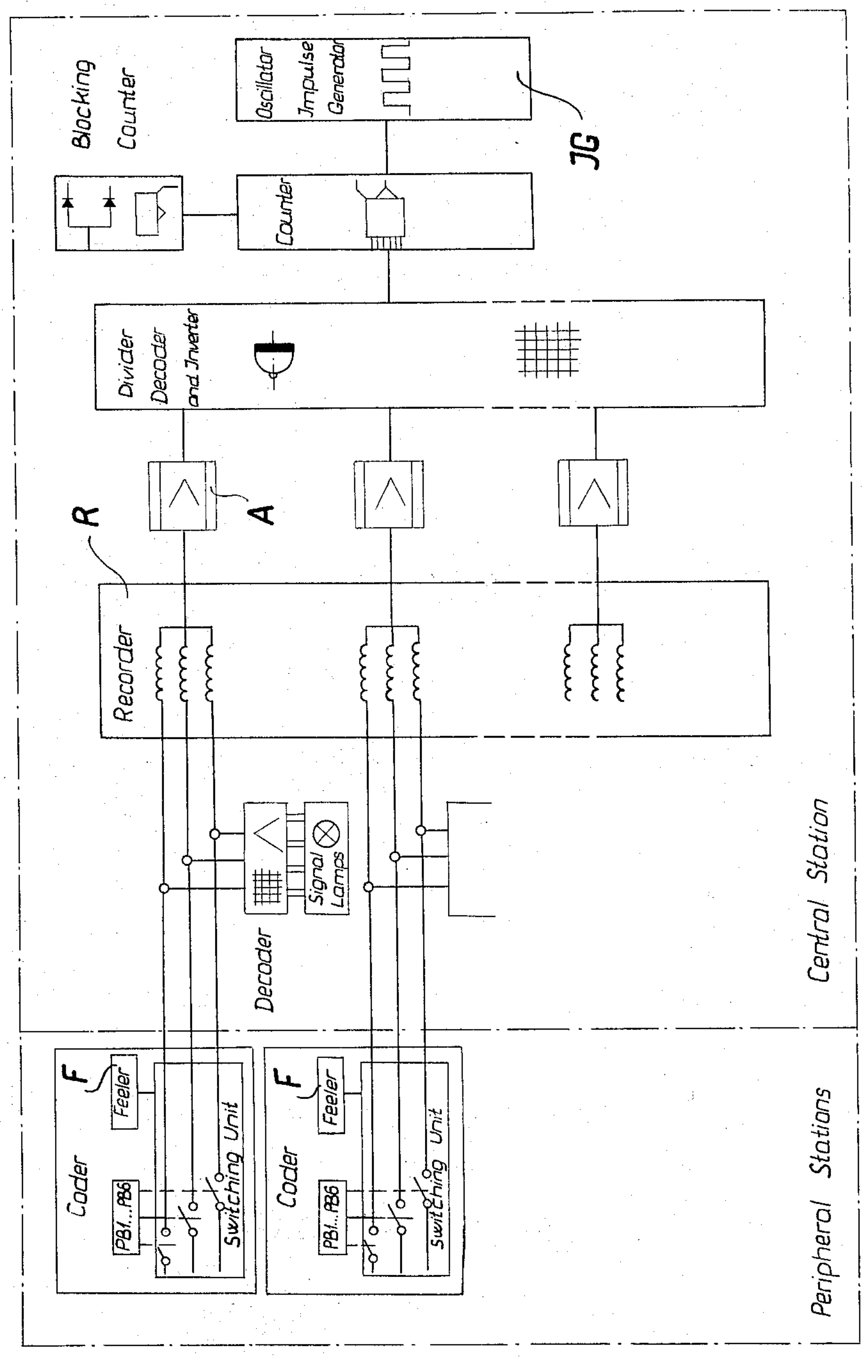
FIG. 9 is a block diagram of an exemplified embodiment of a complete system according to the invention.

FIG. 9 shows the block diagram of the whole system according to the invention in an exemplified case in which central instruments and peripheral devices are shown distinguished from one another in central and peripheral stations. The peripheral portion of the apparatus according to the invention comprises a series of stations of coders with push buttons PB1 to PB6 and a feeler F as well as a switching unit. It means eight information per peripheral stations and, then, requires three recorders per unit in the control station.

The central station comprises decorders with signal lamps, three recorders and amplifiers for each peripheral station, a common divider, decoder and inverter, a binary counter and an oscillator (pulse generator IG). The impulses of the oscillator having been counted by the counter are divided among the power amplifiers by the divider. If e.g. the pulse generator IG has a frequency of 1 cycle per second, then ten amplifiers can be modulated in such a manner that each amplifier becomes operated every ten seconds. If the pulse generator has a frequency greater than 1 cycle per second, such as 10 cycles per second, excitation of the magnets should obviously be interrupted for a time period of about 10 seconds after each operation thereof. This is obtained by a blocking counter in a manner known per se.

In operation, the pulse generator IG supplies the counter with impulses which are divided by the divider to the power amplifiers A which are operated, say, in every ten seconds. Each amplifier provides three magnets 12 with energy which is applied, according to the cadencing of the divider, to these magnets in every ten seconds.

However, only those magnets 12 of a group of three magnets will respond to such impulses the exciting circuits of which are closed. If none of such exciting circuits is closed the recorder keys 15 will make no signs on the respective chart papers 17 as shown at line 1 of column I in FIG. 3. On the other hand, if at least one of the push buttons PB1 to PB6 is pressed down and/or the feeler F is actuated, the exciting circuit of at least one magnet 12 is closed through the output terminals OC1, OC2, OC3 and the input terminal of the control unit C (FIG. 1) so that upon an impulse coming from the pulse generator IG through the counter, divider and amplifier the coil 10 of the respective magnet 12 becomes excited. Thereupon, the armature 12 is angularly displaced in the clockwise sense (FIG. 2) whereby the connecting rod 14 rotates the key 15 in the counter clockwise sense and the pen 16 strikes against the chart paper 17 on which it makes a sign in the form of a point or short line. The speed of progressing the chart paper 17 is selected so that signs made by the key 15 in subsequent time periods of ten seconds will add to a seemingly continuous strip 18.

Thus, operation of the recorder R is dependent on both closing the circuit of the exciting coil 10 of at least one magnet 12 by means of operating a respective control unit C at one of the peripheral stations, and on applying an impulse to the said exciting coil 10 of said magnet 12 by the pulse generator IG through the divider and the respective power amplifier A.

The obtained information appears, besides on the chart paper 17, also by means of the decoder and its signal lamps.

Obviously, by employing further push buttons, a further lead and one further recorder the information supplied by the coder unit may be doubled.

The present invention has been described particularly with respect to checking and recording manufacturing processes. It is, however, obvious that the apparatus according to the invention may be employed in all cases where distinguishing, recording and/or evaluating of sensible and/or selectable procedures is required. Thus, for instance, the apparatus according to the invention can be used for checking traffic schedules, for recording prescribed or irregular operation and loading of transport means, or the like. These are mutually excluded processes. However, the apparatus according to the invention is suitable to similar recording of simultaneous processes such as checking the feed apparatus of iron works (blast furnaces) or the operation of the rolling mills of steel works and thereby for ascertaining failures of organisation, etc. Moreover, it is suitable to be employed outside technical domains e.g. for distinguishing, recording, evaluating, etc. of biological, therapeutical processes and the like in the aforesaid manner.

What we claim is:

Electric apparatus for analyzing manufacturing processes, comprising a plurality of peripheral stations, said peripheral stations including coding means, each said coding means having an input terminal, at least two output terminals and switch means for selectively connecting said input terminal to at least one of said output terminals, a central station, said central station including a plurality of recording elements for recording in binary code, a predetermined number of said elements associated with each said coding means, pulse generating means coupled to said recording elements, each of said output terminals being connected to one of said recording elements, and timing means coupled to said pulse generating means and said recording elements for applying pulses to different ones of said predetermined number of said elements at predetermined selectively spaced time periods.

References Cited by the Examiner

UNITED STATES PATENTS

| | | | |
|---|---|---|---|
| 726,301 | 4/1903 | Huss et al. | 346—33 |
| 831,030 | 9/1906 | Berry | 346—33 |
| 2,528,394 | 10/1950 | Sharpless et al. | 235—92 |
| 2,759,784 | 8/1956 | Burke | 346—33 |
| 2,925,308 | 2/1960 | Barker et al. | 346—35 X |
| 2,944,867 | 7/1960 | Gregory | 346—141 X |
| 2,955,896 | 11/1960 | Fritzinger | 346—141 X |
| 3,161,457 | 12/1964 | Schroeder et al. | 346—78 X |

RICHARD B. WILKINSON, *Primary Examiner.*

LEO SMILOW, LOUIS J. CAPOZI, *Examiners.*

JOSEPH W. HARTARY, *Assistant Examiner.*